United States Patent
Park

(10) Patent No.: US 9,563,246 B2
(45) Date of Patent: Feb. 7, 2017

(54) INTERFACE DEVICE, VEHICLE HAVING THE SAME, AND METHOD OF CONTROLLING THE SAME

(71) Applicant: Hyundai Motor Company, Seoul (KR)

(72) Inventor: Sung Jun Park, Gyeonggi-Do (KR)

(73) Assignee: Hyundai Motor Company, Seoul (KR)

( * ) Notice: Subject to any disclaimer, the term of this patent is extended or adjusted under 35 U.S.C. 154(b) by 91 days.

(21) Appl. No.: 14/565,134

(22) Filed: Dec. 9, 2014

(65) Prior Publication Data

US 2016/0091942 A1    Mar. 31, 2016

(30) Foreign Application Priority Data

Sep. 25, 2014    (KR) .................. 10-2014-0128182

(51) Int. Cl.
  *G06F 1/26*    (2006.01)
  *G06F 1/32*    (2006.01)

(52) U.S. Cl.
  CPC ............ *G06F 1/266* (2013.01); *G06F 1/3296* (2013.01)

(58) Field of Classification Search
  CPC ........ G06F 1/3202; G06F 1/3231; G06F 1/26; G06F 1/206; G06F 1/3228; G06F 1/08; G06F 1/3289; G06F 1/266; H04L 12/12; H04L 12/10
  See application file for complete search history.

(56) References Cited

U.S. PATENT DOCUMENTS

| | | | |
|---|---|---|---|
| 7,502,949 B2 * | 3/2009 | Park ....................... | G06F 1/263 320/110 |
| 8,892,912 B2 * | 11/2014 | Lai .......................... | G06F 1/266 713/300 |
| 2008/0012524 A1 * | 1/2008 | Yu ......................... | H01M 10/44 320/103 |
| 2008/0126593 A1 * | 5/2008 | Wang .................... | G06F 13/385 710/16 |

(Continued)

FOREIGN PATENT DOCUMENTS

| | | |
|---|---|---|
| KR | 20-0371116 Y1 | 12/2004 |
| KR | 10-2012-0111608 A | 10/2012 |

(Continued)

OTHER PUBLICATIONS

Choi, Kyeong Soo, Car data communicaion module; English translation of KR-10-1276773.*

(Continued)

*Primary Examiner* — Zahid Choudhury
(74) *Attorney, Agent, or Firm* — Mintz Levin Cohn Ferris Glovsky and Popeo, P.C.; Peter F. Corless

(57) ABSTRACT

An interface device, a vehicle having the same, and a method of controlling the same are provided. The interface device includes a port unit to which the external device is connected and is configured to transmit a first current transmitted from the multimedia player to the external device. A regulation unit is configured to regulate external power into a second current and a selection unit is configured to switch the first current transmitted to the port unit to the second current based on a mode of the external device. Merchantability is improved since an electronic device within the vehicle is rapidly charged using a USB port.

19 Claims, 11 Drawing Sheets

(56) References Cited

U.S. PATENT DOCUMENTS

2014/0050331 A1\* 2/2014 Choi ................... G06F 13/385
                                                    381/86
2015/0186315 A1\* 7/2015 Park .................... G06F 13/385
                                                    710/301

FOREIGN PATENT DOCUMENTS

| KR | 10-2012-0133071 A | 11/2012 |
| KR | 10-1231599 | 2/2013 |
| KR | 10-2013-0067573 A | 6/2013 |
| KR | 10-1276773 | 6/2013 |
| KR | 2013-0081570 | 7/2013 |

OTHER PUBLICATIONS

Korean Office Action for Korean Application No. 10-2014-0128182, English translation, 17 pages.
Korean Notice of Patent Allowance for Korean Patent Application No. 10-2014-0128182, dated Mar. 29, 2016, English Abstract, 8 pages.

\* cited by examiner

INTERFACE DEVICE, VEHICLE HAVING THE SAME, AND METHOD OF CONTROLLING THE SAME

CROSS-REFERENCE TO RELATED APPLICATION

This application claims the benefit of Korean Patent Application No. 10-2014-0128182, filed on Sep. 25, 2014 in the Korean Intellectual Property Office, the disclosure of which is incorporated herein by reference.

BACKGROUND

1. Field

The present invention relates to an interface device that performs communication between at least two devices, a vehicle having the same, and a method of controlling the same.

2. Description of the Related Art

A vehicle typically includes a cluster configured to display driving functions such as a vehicle speed, an engine revolutions per minute (RPM), a fuel level, cooling water, etc. and vehicle information. Further, the vehicle typically includes additional functions for user convenience such as an audio function, a video function, a navigation function, air conditioning control, seat control, lighting control, etc. besides the basic driving functions. The vehicle also includes various multimedia players such as an audio, video and navigation (AVN) device in which a navigation function, an audio function, and a video function are integrated, an audio device, a terminal, etc.

Specifically, a multimedia player plays data stored in each device by connecting a MP3 player, a universal serial bus (USB) storage device, a mobile communication terminal, etc. to the multimedia player within the vehicle. The multimedia player within the vehicle includes an interface device that has a USB port or an auxiliary (AUX) terminal. Further, the interface device of the multimedia player includes a secure digital (SD) slot to which a SD storage device is connected.

The USB port within the interface device does not require a separate power source. In other words, since a portion of power provided from a battery or a head unit within the vehicle is provided to the USB port, no separate power source is required. A USB 2.0 port recently used uses a voltage of 5V and a current of 500 mA. Accordingly, small devices that support the USB 2.0 port are regarded as devices capable of being driven using low power equal to or less than about 2.5 W, and devices requiring power greater than about 2.5 W require power to be supplied from a separate power source. Recently, the mobile interface devices such as a mobile phone, a tablet personal computer (PC) are charged through the USP port, but the charging of the mobile interface devices is substantially slow due to a power limitation of 2.5 W.

SUMMARY

Therefore, the present invention provides an interface device configured to transfer varied currents to an external device when data communication and a charge are simultaneously performed or a charge is performed, a vehicle having the same, and a method of controlling the same. In addition, the present invention provides an interface device configured to read data stored in a card-type memory using a secure digital (SD) communication line that uses one hub unit, output the read data by switching to a universal serial bus (USB) communication line, and receive a mode selection signal of an external device, a vehicle having the same, and a method of controlling the same.

Additional aspects of the invention will be set forth in part in the description which follows and, in part, will be obvious from the description, or may be learned by practice of the invention.

In accordance with one aspect of the present invention, an interface device connecting a multimedia player and an external device may include: a port unit in which the external device may be connected, and configured to transmit a first current transmitted from the multimedia player to the external device; a regulation unit configured to regulate external power into a second current; and a selection unit configured to switch the first current transmitted to the port unit to the second current based on a mode of the external device.

The interface device may further include: a hub unit configured to receive a mode selection signal of the external device from the multimedia player, receive the mode selection signal for selecting a first mode of simultaneously performing data communication and a charge or a second mode of performing the charge, and transmit the mode selection signal to the selection unit. The selection unit may transmit the first current to the port unit when the mode selection signal of the first mode is received, and transmit the second current to the port unit when the mode selection signal of the second mode is received.

The hub unit may be configured to perform USB communication with the multimedia player and the selection unit, and transmit a voltage signal transmitted through VBUS of a USB connector unit of the multimedia player to the selection unit. The interface device may further include a slot unit in which a card-type memory may be connected, and the hub unit may be connected to the slot unit and switch a communication line of the card-type memory to a USB communication line. The interface device may further include: a first connector unit connected to the hub unit, and configured to transmit data of the card-type memory to the multimedia player; and a second connector unit connected to the selection unit, and configured to transmit data of the external device to the multimedia player and transmit the first current transmitted from the multimedia device to the selection unit.

Each of the first connector unit and the second connector unit may include a USB port having an independent USB communication line. The first connector unit and the second connector unit may be connected to the multimedia player via a cable or a connector. The interface device may further include a terminal unit configured to input and output an audio signal.

In accordance with another aspect of the present invention, a vehicle, may include: a multimedia player; an interface device configured to transmit data to the multimedia player. The interface device may include a port unit to which the external device may be connected, and configured to perform USB communication with the external device. In addition, the vehicle may include a regulation unit configured to regulate external power into a constant current and a selection unit configured to transmit or block the constant current to the port unit based on a mode of the external device. The port unit may be configured to receive a reference current from the multimedia player, and transmit the reference current to the external device, and the selection unit may be configured to transmit or block the reference current to the port unit based on the mode of the external device.

The interface device further may include a hub unit configured to receive a mode selection signal of the external device from the multimedia player, receive the mode selection signal for selecting a first mode of simultaneously performing data communication and a charge or a second mode of performing the charge, and transmit the mode selection signal to the selection unit. The selection unit may be configured to transmit the reference current to the port unit when the mode selection signal of the first mode is received, and transmit the constant current to the port unit when the mode selection signal of the second mode is received. The hub unit may be configured to perform the USB communication with the multimedia player and the selection unit, and transmit a voltage signal transmitted via a VBUS of a USB connector unit of the multimedia player to the selection unit, and the voltage signal transmitted through the VBUS may be the mode selection signal of the second mode.

The vehicle may further include a slot unit in which a card-type memory in which map data is stored may be connected, and the hub unit may be connected to the slot unit and switch a communication line of the card-type memory to a USB communication line. The vehicle may further include: a first connector unit connected to the hub unit, and configured to transmit data of the card-type memory to the multimedia player; and a second connector unit connected to the selection unit, and configured to transmit data of the external device to the multimedia player and transmit the reference current transmitted from the multimedia device to the selection unit. Each of the first connector unit and the second connector unit may include a USB port having an independent USB communication line.

The multimedia player may include: a third connector unit connected to the first connector unit, and configured to receive the data of the card-type memory; a fourth connector unit connected to the second connector unit, and configured to receive the data of the external device and transmit the reference current; and a microcomputer (e.g., a controller) configured to receive at least one of the data of the card-type memory or the data of the external device. The microcomputer or controller may be configured to independently execute communications of the third connector unit and the fourth connector unit. The multimedia player may be configured to perform a portion of functions of the external device connected to the third connector unit.

In accordance with still another aspect of the present invention, a method of controlling an interface device for transmitting data to a multimedia player arranged in the vehicle, may include: determining, by a controller, whether an external device performing USB communication is connected; determining, by the controller, a mode of the external device in response to determining that the external device is connected; transmitting, by the controller, a first current transmitted from the multimedia player to the external device when the mode of the external device is a first mode; and transmitting, by the controller, a second current to the external device by regulating external power into the second current when the mode of the external device is a second mode.

The first mode may be a mode of charging the external device and performing data communication between the external device and the multimedia player, and the second mode may be a charge-only mode of charging the external device. The determining of the mode of the external device may include determining, by the controller, whether a mode selection signal for the second mode is transmitted from the multimedia player. The method of operating the interface device may further include: determining, by the controller, whether a navigation function is performed in the multimedia player; and transmitting, by the controller, map data stored in a card-type memory to the multimedia player via a (e.g., a first) USB communication line by switching a SD communication line to the USB communication line when the navigation function is performed.

The method of operating the interface device may further include: determining, by the controller, whether the external device is connected to a port unit of the interface device while performing the navigation function; and transmitting, by the controller, the data of the external device to the multimedia player via another (e.g., a second) USB communication line which is different from the USB communication line in response to determining that the external device is connected to the port unit.

BRIEF DESCRIPTION OF THE DRAWINGS

These and/or other aspects of the invention will become apparent and more readily appreciated from the following description of the exemplary embodiments, taken in conjunction with the accompanying drawings of which.

DETAILED DESCRIPTION

Figure 1:
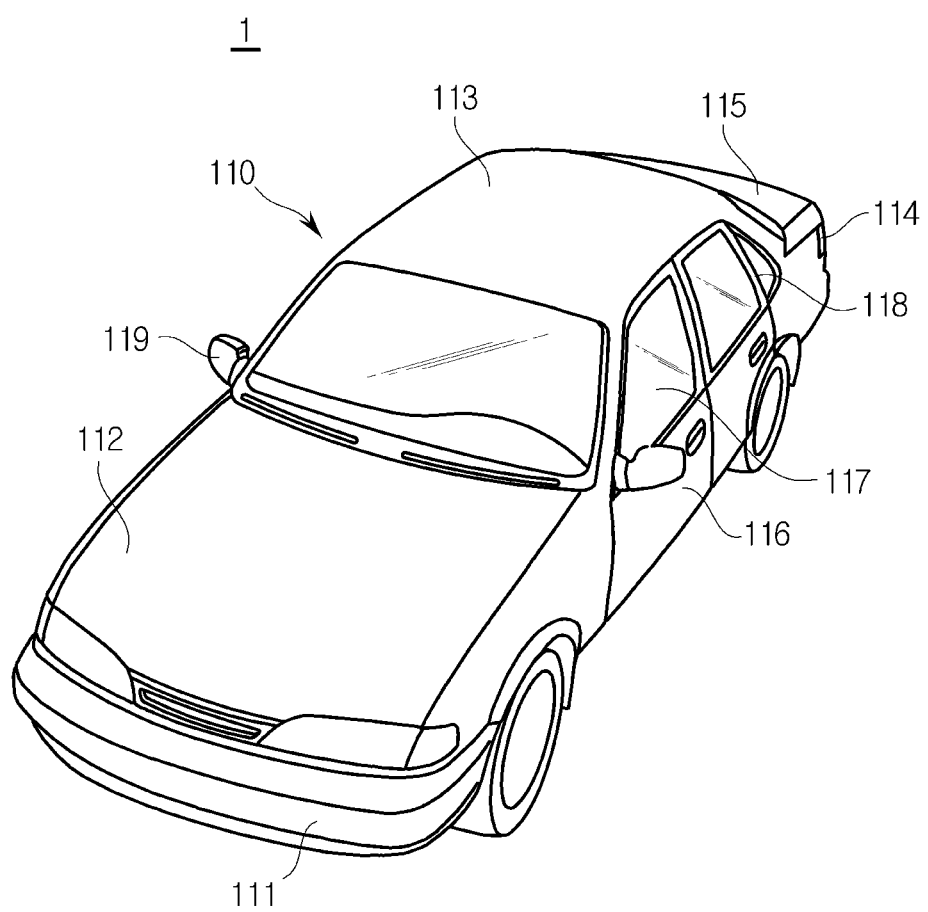
FIG. 1 is an exemplary diagram illustrating a vehicle in which an interface device is installed according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention will be described in detail with reference to the accompanying drawings.

Figure 2:
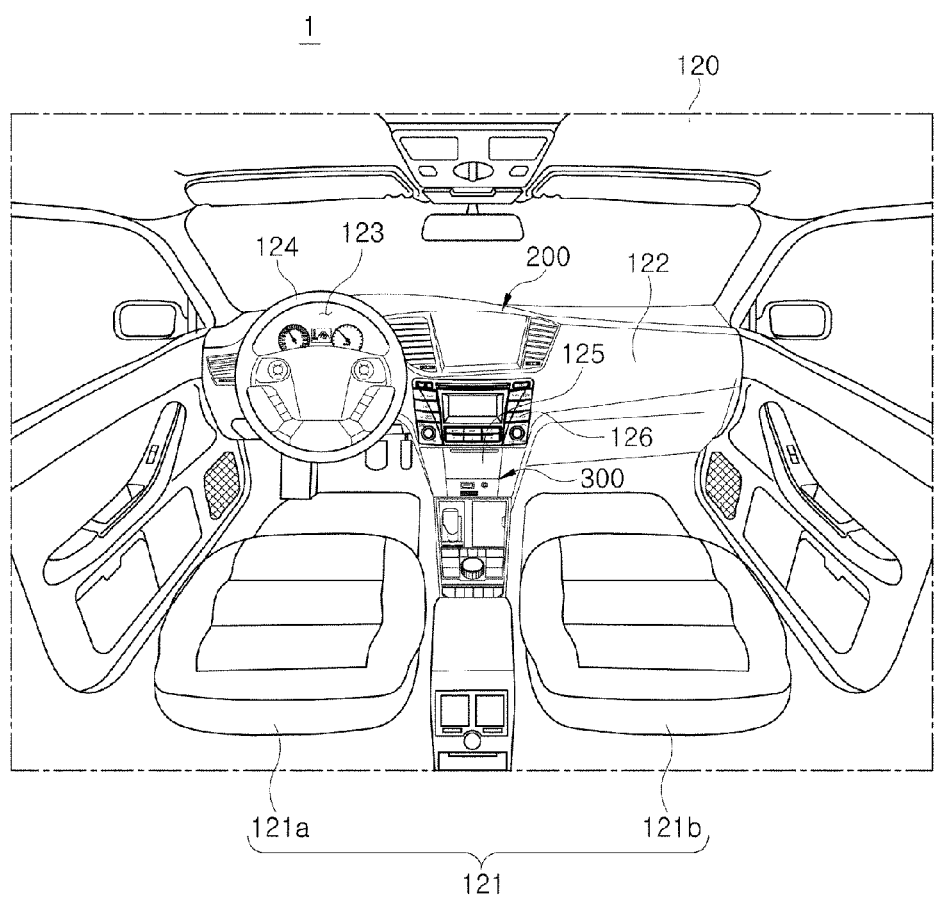
FIG. 2 is an exemplary diagram illustrating the inside of a vehicle in which an interface device is installed according to an exemplary embodiment of the present invention.

FIG. 1 is an exemplary diagram illustrating a vehicle in which an interface device is installed according to an exemplary embodiment of the present invention, and FIG. 2 is an exemplary diagram illustrating the inside of a vehicle in which an interface device is installed according to an exemplary embodiment of the present invention. A vehicle 1 may be an apparatus operated by driving wheels for the purpose of transporting a person or goods, and traveling on a road. The vehicle 1 may include a body having an interior and an exterior, and a chassis in which machine apparatuses required for driving are installed as a remaining portion excluding the body. As shown in FIG. 1, an exterior 110 of the body may include a front panel 111, a bonnet 112, a roof panel 113, a rear panel 114, a trunk 115, and front, rear, left and right doors 116, etc.

The exterior 110 of the body may further include the front panel 111, the bonnet 112, the roof panel 113, the rear panel 114, the trunk 115, and window glasses 117 installed in each of the front, rear, left and right doors 116, and pillars 118 disposed in the boundary of front, rear, left and right window glasses 117. Further, the window glasses 117 further include quarter window glasses installed between the pillars 118 and fixed to not be opened and closed, a rear window glass installed in the rear side, and a front window glass installed in the front side. The exterior 110 of the body may further include side mirrors 119 for providing a driver with a field of view of the rear side of the vehicle 1. The chassis of the vehicle 1 may include a power generation apparatus, a power transfer apparatus, a driving apparatus, a steering apparatus, a brake apparatus, a suspension apparatus, a transmission apparatus, a fuel apparatus, front, rear, left, and right wheels, etc.

The vehicle 1 may further include various safety apparatuses for safety of a driver and a passenger. The safety apparatuses of the vehicle 1 may include various safety apparatuses such as an air bag control device for safety of the driver and the passenger during a vehicle collision, an electronic stability control (ESC) device configured to stably adjust the attitude of the vehicle while accelerating and cornering, etc. The vehicle 1 may further include sensing devices such as a proximity sensor configured to sense obstacles or another vehicle of the rear or the side, and a rain sensor configured to sense rainfall and the amount of rainfall, etc.

The vehicle 1 may include an electronic control unit (ECU) configured to operate the power generation apparatus, the power transfer apparatus, the driving apparatus, the steering apparatus, the brake apparatus, the suspension apparatus, the transmission apparatus, the fuel apparatus, the various safety apparatuses, and various sensors. Further, the vehicle 1 may selectively include electronic devices such as a hands-free apparatus, a global positioning system (GPS), an audio device, and a Bluetooth apparatus, a rear camera, a terminal charge device, a Hi-pass device, etc., installed for driver convenience.

Moreover, the vehicle 1 may further include a multimedia player 200 configured to integrally perform a DMB function, an audio function, a video function, a navigation function, etc. In other words, the multimedia player 200 may be a navigation (an audio, video, navigation (AVN)) device, or a terminal configured to perform communication in which a navigation application is installed. In particular, the navigation device may be a device configured to receive position information from satellites through a plurality of global positioning systems (GPSs), calculate a current position of the vehicle, display the calculated current position by matching on map data which is previously stored, perform a path retrieval from the calculated current position toward destination based on a predetermined path retrieval algorithm by receiving an input of the destination from the user, displaying the retrieved path by matching on the map, and guiding the user toward the destination according to the path. The navigation device may be installed to be detachable on the dash board.

The multimedia player 200 may include an input unit configured to receive an input of a user command, a display unit configured to display operation information, and a controller 250 configured to operate the display unit based on the input user comment. The display unit of the multimedia player 200 may be implemented as a flat display panel such as a liquid crystal display (LCD), a plasma display panel (PDP), an organic light emitting display (OLED), etc. Further, the input unit of the multimedia player 200 may be implemented as a touch screen type by further including a touch panel integrally formed in a flat display panel. In other words, the input unit and the display unit of the multimedia player 200 may be implemented as a touch screen.

The controller 250 of the multimedia player 200 may be configured to use map data of a card-type memory transmitted from an interface device 300 when performing the navigation function. Further, the controller 250 of the multimedia player 200 may be configured to receive data of an external device when the external device is connected to the interface device 300, and perform a function of the external device, that is, a CarPlay function, based on the received data. In other words, the controller 250 of the multimedia player 200 may be configured to perform a portion of the function performed in a mobile communication terminal which is the external device.

The controller 250 of the multimedia player 200 may be configured to independently receive the data of the card-type memory and the data of the external device connected to the interface device 300, and perform a corresponding function using the received data independently. Further, controller 250 of the multimedia player 200 may be connected to the interface device 300 via a cable or a connector, and may be configured to transmit a reference current via the cable or the connector when performing universal serial bus (USB) communication with the interface device 300. In particular, the reference current may be about 500 mA as a current flowing through a USB cable. A voltage of about 5V may be applied to the USB cable. Further, the reference current may be about 900 mA as a current flowing through a USB cable.

The vehicle 1 may further include a start button configured to receive an operation command input to a start motor (not shown). In other words, the vehicle 1 may be configured to operate the start motor (not shown) when the start button is turned on, and drive an engine (not shown) which is the power generation apparatus by the operation of the start motor. The vehicle 1 may further include a battery (not shown) electrically connected to a terminal, the audio device, a dome light, the start motor, and other electronic devices and may be configured to provide driving power. The battery may further be configured to perform a charge operation using a self-generator or the power of the engine while driving.

As shown in FIG. 2, the interior 120 of the body may include a seat 121 (121a and 121b) in which a passenger sits, a dash board 122, an instrument panel (that is, a cluster) 123 installed in the dash board 122 and in which a tachometer, a speedometer, a coolant temperature meter, a fuel gauge, a turn signal indicator light, a high beam indicator light, a warning light, a safety belt warning light, an odometer, an automatic shift selection lever indicator light, a door alarm warning light, an engine oil warning light, and a fuel shortage warning light are installed, a steering wheel 124 configured to control a direction of the vehicle 1, and a center fascia 125 in which a control panel of the audio device and the air conditioning device may be installed.

The seat 121 may include a driver seat 121a for a driver, a passenger seat 121b for a passenger, and rear seats disposed in the rear side inside the vehicle 1. The cluster 123 may be implemented by a digital method. The cluster 123 having the digital method may be configured to display vehicle information and driving information using an image. The center fascia 125 may include a head unit 126 disposed between the driver seat 121a and the passenger seat 121b in the dash board 122, and may be configured to operate the audio device, the air conditioning device, and a heat wire of the seat 121. An air outlet and a cigarette lighter may be installed in the center fascia 125.

Further, the interface device 300 for performing data communication between the multimedia player 200 and the external device 400 may be disposed in the center fascia 125. The interface device 300 may be disposed adjacent to the head unit 126, adjacent to the multimedia player 200, and may be electrically connected to the multimedia player 200 via the connector or the cable. In particular, the external device may include a storage device, a communication terminal, a MP3 player, etc.

Figure 3:
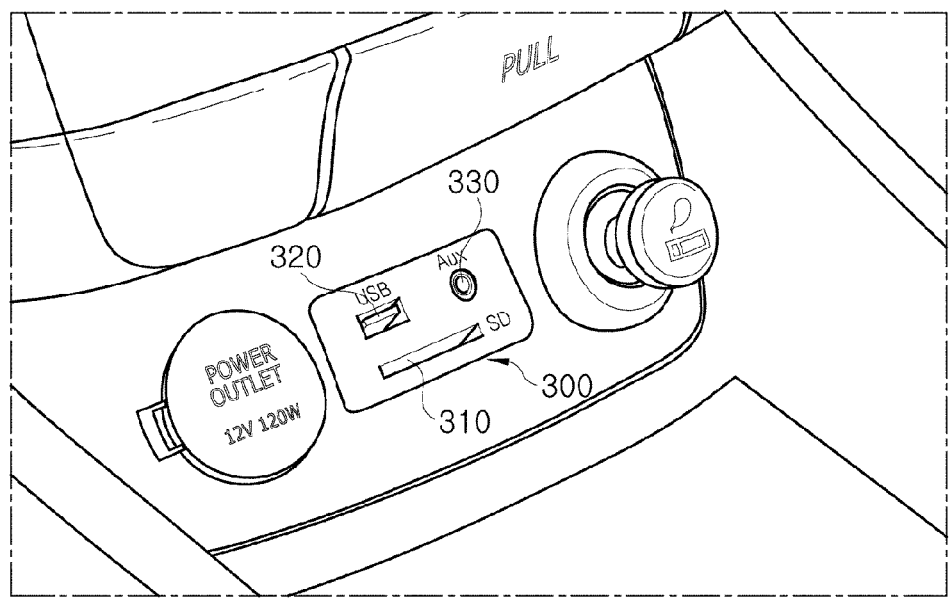
FIG. 3 is an exemplary diagram illustrating an example in which an interface device is installed according to an exemplary embodiment of the present invention.

The storage device may include a card-type memory, a removable hard disk, and the communication terminal may include a smart phone, a notebook, a tablet personal computer (PC), etc. As shown in FIG. 3, the interface device 300 may include a slot unit 310 into which a SD card which is a card-type memory is inserted, a port unit 320 to which a USB port of an external device capable of performing USB communication is connected, and a terminal unit 330 to which a terminal of an auxiliary (AUX) cable of an external device for playing an audio is connected.

Figure 4:
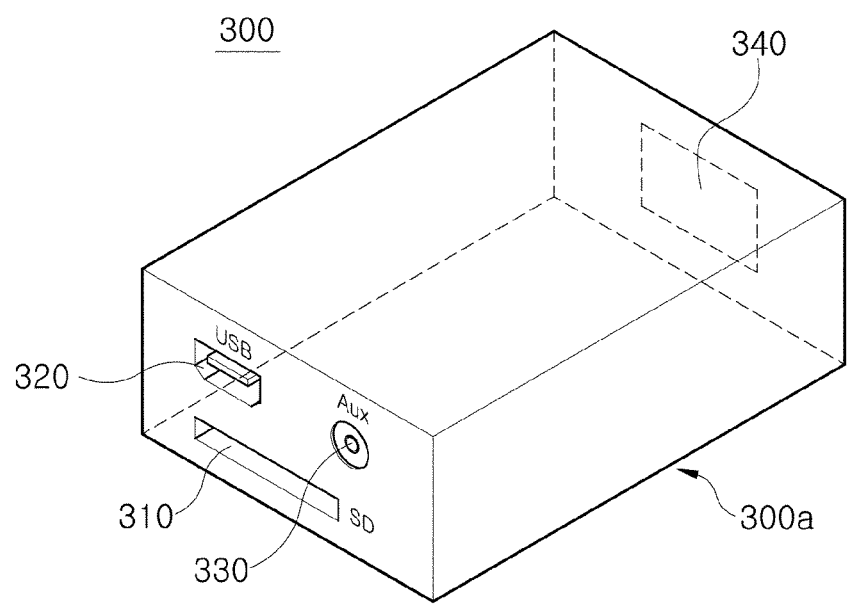
FIG. 4 is an exemplary diagram illustrating the exterior of an interface device according to an exemplary embodiment of the present invention.

As shown in FIG. 4, the interface device 300 may include a body 300a that forms an exterior, and the slot unit 310, the port unit 320, and the terminal unit 330 may be integrally arranged on the body 300a. The interface device 300 may further include a connector unit 340 configured to transmit data of the card-type memory connected to the slot unit 310 to the multimedia player 200, and transmit data of the external device connected to the port unit 320 to the multimedia player 200.

Figure 5:
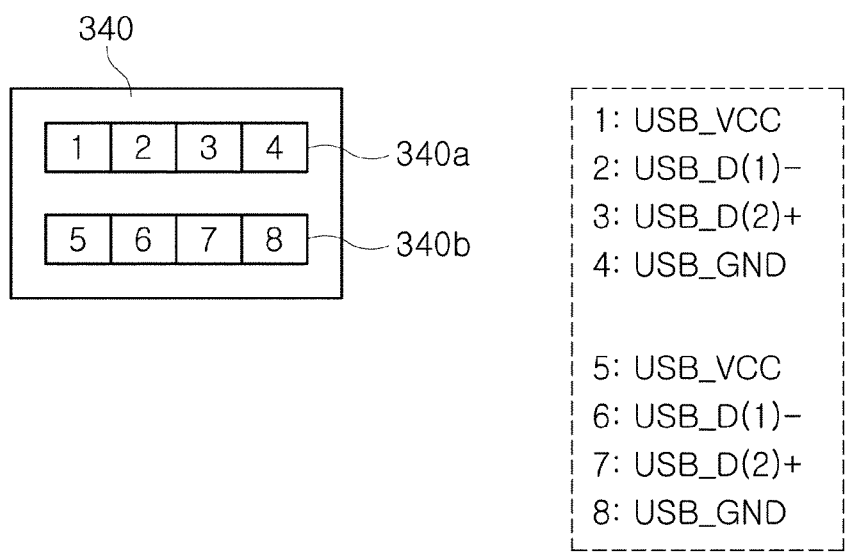
FIG. 5 is an exemplary diagram illustrating a rear side of an interface device according to an exemplary embodiment of the present invention.

As shown in FIG. 5, the connector unit 340 may include a first connector unit 340a configured to transmit the data of the card-type memory to the multimedia player 200, and a second connector unit 340b configured to transmit the data of the external device to the multimedia player 200. In particular, the first connector unit 340a and the second connector unit 340b may be USB ports, be separately installed to perform communication independently, and be connected to the connector units 251 and 252, respectively, of the multimedia player 200. Each of the first connector unit 340a and the second connector unit 340b may include four terminals, i.e., a voltage terminal Vcc, a positive data terminal D+, a negative data terminal D−, and a ground terminal GND. The voltage terminal Vcc and the ground terminal GND may be a power supply terminal, and the negative data terminal D(1)− and the positive data terminal D(2)+ may be a terminal for transmitting and receiving data.

Further, the voltage terminal Vcc of the first connector unit 340a may be configured to receive a mode selection signal of the external device connected to the port unit 320. The power supply terminal of the second connector unit 340b may be configured to generate a first current or a second current to flow to the external device. In particular, the mode selection signal of the external device may include a first mode for performing both of data communication with the external device and a charge of the external device, and a second mode for performing a charge of the external device to have a faster charge time than the first mode. In other words, the interface device 300 may be configured to transmit the first current which is a reference current in the USB communication to the external device when the first mode is selected, and transmit the second current for a quick charge to the external device when the second mode is selected.

Figure 6:
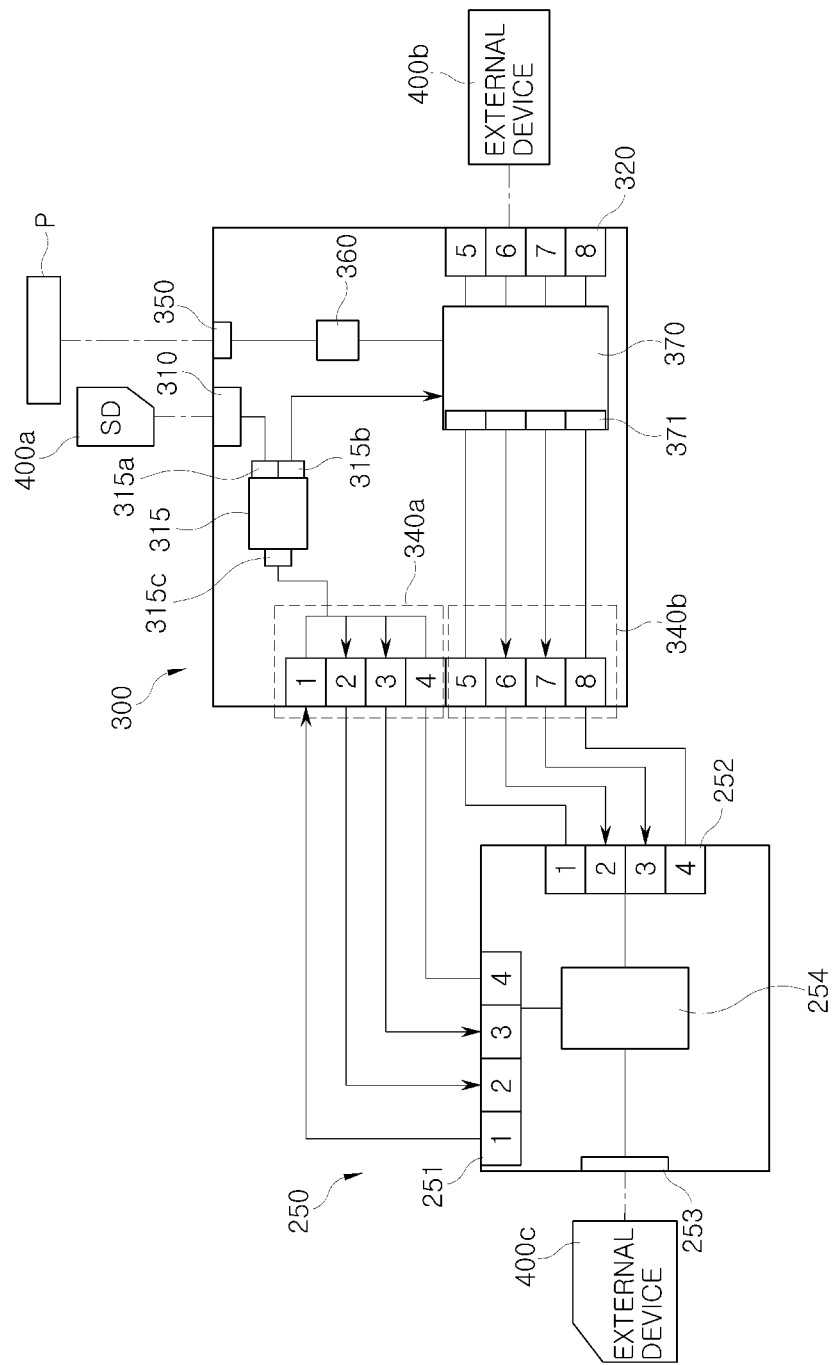
FIG. 6 is an exemplary diagram illustrating connection between an interface device and a multimedia player according to an exemplary embodiment of the present invention.

In particular, the second current may be greater than the first current. This will be described in detail with reference to FIG. 6. The interface device 300 may include a slot unit 310, a hub unit 315, a port unit 320, a terminal unit 330, a connector unit 340, a connection unit 350, a regulation unit 360, and a selection unit 370. The slot unit 310 may be a slot to which a SD card which is a card-type memory is connected, and may be configured to transmit data stored in the SD card to the hub unit 315 via a SD communication line. The SD card which is the card-type memory may be configured to store map data required for performing a navigation function. The SD card 400a may be detachable from the slot unit 310, and the stored map data may be updated. The slot unit 310 may be configured to read the map data stored in the SD card 400a when performing the navigation function in the multimedia player 200, and output the read map data via the SD communication line.

The hub unit 315 may be a hub integrated circuit (IC) configured to transmit the received data in at least one direction, and transmit data transmitted from a plurality of external devices to the multimedia player 200 or transmit data transmitted from the multimedia player 200 to at least one of the plurality of external devices. The hub unit 315 may include a first hub terminal 315a connected to the slot unit 310, a second hub terminal 315b connected to the selection unit 370, and a third hub terminal 315c connected to the multimedia player 200, and perform bidirectional communication. More specifically, the first hub terminal 315a of the hub unit 315 may be configured to output received data to the third hub terminal 315c by switching to the USB communication line when the data of the card-type memory is received from the slot unit 310 via the SD communication line.

A distance between the slot unit 310 of the card-type memory and the hub unit 315 may be designed within about 200 mm by arranging both of the slot unit 310 and the hub unit 315 on the interface device 300. Accordingly, since a high-priced cable of the card-type memory is omitted, a manufacturing cost may be reduced. Further, the second hub terminal 315b of the hub unit 315 may be configured to transmit a received mode selection signal to the selection unit 370 when the mode selection signal of the external device is received from the third hub terminal 315c, and transmit the mode selection signal through the USB communication line.

The third hub terminal 315c of the hub unit 315 may be a terminal selectively connected to the first hub terminal 315a and the second hub terminal 315b, and may be configured to transmit data of the card-type memory to the multimedia player 200 via the first connector unit 340a when connected to the first hub terminal 315a and receive the data of the card-type memory or transmit the mode selection signal of the external device to the selection unit 370 when connected to the second hub terminal 315b and receive the mode selection signal of the external device transmitted from the multimedia player 200 via the first connector unit 340a.

The hub unit 315 may be connected to the slot unit 310 via the SD communication line, be connected to the first connector unit 340a via the USB communication line, and be connected to the selection unit 370 via the USB communication line. In addition, the hub unit 315 may be configured to transmit the data of the SD card to the first connector unit 340a by switching to the USB communication line when the data of the SD card is received via the SD communication line.

The port unit 320 may be a port to which a mobile communication terminal 400b which is the external device is connected, be connected to the mobile communication terminal 400b via the USB cable, and may be configured to transmit data of the mobile communication terminal 400b to the second connector unit 340b. In other words, the interface device 300 may be configured to connect the multimedia player 200 within the vehicle 1 and the mobile communication terminal 400b via the USB communication. The port unit 320 may be connected to the selection unit 370 via the USB communication line, and may be configured to transmit the first current or the second current to the mobile communication terminal 400b which is the external device when the first current or the second current is transmitted from the selection unit 370.

Particularly, the mobile communication terminal 400b may be a terminal configured to perform the USB communication, may include a USP port, and may be configured to output internal data to the multimedia player 200 via the USB cable when one end of the USB cable is connected to the USB port. The mobile communication terminal 400b may be configured to perform a charge using a current transmitted from the interface device 300, or perform communication with the multimedia player 200. The mobile communication terminal 400b may be configured to perform an operation as a first mode of performing both of data communication and a charge based on an amplitude of a current transmitted to the interface device 300 and a second mode of performing a rapid charge, and the first mode and the second mode may be selected by the multimedia player 200.

Further, the first mode and the second mode may be selected via the mobile communication terminal 400b. Moreover, the mobile communication terminal 400b may be a device that includes at least one application such as a smart phone or a tablet PC, and may be configured to transmit data to the multimedia player 200 to execute the at least one application in the multimedia player 200 which is separate device. In particular, an operation in which the application of the mobile communication terminal 400b is executed in the multimedia player 200 may be a mirroring operation of transmitting a screen of the mobile communication terminal 400b to the display unit of the multimedia player 200 within the vehicle 1, and a display function may be performed in the display unit of the multimedia player 200 and an actual execution of the application, a data processing, and communication may be performed in the mobile communication terminal 400b. In other words, the screen of the mobile communication terminal 400b may not be transmitted to the multimedia player 200, and an available function within the vehicle 1 may be transmitted to the multimedia player 200 to transmit to the display unit of the multimedia player 200.

The terminal unit 330 may be a terminal to which the AUX cable connected to the external device for playing an audio may be connected, and may be the AUX terminal. The terminal unit 330 may be configured to transmit audio data of the external device connected to the AUX cable to the multimedia player 200 or the audio device (not shown) within the vehicle 1 to play the audio of the external device. The connector unit 340 may include a first connector unit 340a connected to the third hub terminal 315c of the hub unit 315 and the multimedia player 200, and a second connector unit 340b connected to the multimedia player 200 and the selection unit 370.

Each of the first connector unit 340a and the second connector unit 340b may include a USB port, and the data of the card-type memory and the data of the external device may be transmitted to the controller 250 of the multimedia player 200. The first connector unit 340a and the second connector unit 340b may be configured to transmit data to the multimedia player 200 via different USB communication lines. The first connector unit 340a and the second connector unit 340b may be connected to the connector units 251 and 252 of the multimedia player 200 through each USB cable, or be directly connected to the multimedia player 200 through the USB port.

The first connector unit 340a may be connected to the third connector unit 251 of the multimedia player 200, and the second connector unit 340*b* may be connected to the fourth connector unit 252 of the multimedia player 200. The first connector unit 340*a* may be configured to transmit the data of the card-type memory transmitted from the first hub terminal 315*a* of the hub unit 315 to the third connector unit 251 of the multimedia player 200. The first connector unit 340*a* may be configured to receive the mode selection signal of the external device transmitted from the third connector unit 251 of the multimedia player 200, and transmit the received mode selection signal to the third hub terminal 315*c* of the hub unit 315 when the external device is connected.

The second connector unit 340*b* may be configured to transmit the data of the external device transmitted from the selection unit 370 to the fourth connector unit 252 of the multimedia player 200 when the external device is connected. The second connector unit 340*b* may be configured to transmit the first current transmitted from the fourth connector unit 252 of the multimedia player 200 to the selection unit 370 when the external device is connected. The connection unit 350 may be a terminal to which the power supply unit for supplying power is connected, receive external power from the power supply unit, and transmit the received external power to the regulation unit 360.

In particular, the power supply unit may be a battery disposed within the vehicle, and may be an ACC power terminal of about 12V configured to supply the power to an electronic device disposed within the vehicle 1. The regulation unit 360 may be disposed between the connection unit 350 and the selection unit 370 and may be configured to regulate the external power transmitted from the connection unit 350 into rated power and transmit the regulated rated power to the selection unit 370. The regulation unit 360 may be a constant voltage regulator configured to regulate the external power into a substantially constant voltage, and output a constant voltage and a constant current (that is, the second current).

The substantially constant voltage may be about 5V, and the substantially constant current may be about 3A. The selection unit 370 may be disposed between the second connector unit 340*b* and the port unit 320, and may be configured to transmit the first current transmitted from the second connector unit 340*b* to the port unit 320 or the second current transmitted from the regulation unit 360 to the port unit 320. The selection unit 370 may be configured to perform the USB communication with the hub unit 315, and switch a current for transmitting to the port unit 320 from the first current to the second current when a voltage signal of VBUS for selecting the second mode is received from the second hub terminal 315*b* of the hub unit 315. The selection unit 370 may include a switch configured to select the first current which is the reference current or the second current which is the constant current.

The first current and the second current may be currents used to the external device, and the second current may be greater than the first current. Further, the selection unit 370 may include the USB port 371 and may be configured to perform the USB communication with the second connector unit 340*b* via the USB port 371, perform the USB communication with the port unit 320, and transmit data of the external device connected to the port unit 320 to the multimedia player 200 via the second connector unit 340*b*. In other words, the selection unit 370 may be connected to the hub unit 315, the second connector unit 340*b*, and the port unit 320 via the USB port, and may be configured to perform the USB communication.

The controller 250 of the multimedia player 200 may include the third connector unit 251, a fourth connector unit 252, and a microcomputer 254. Each of the third connector unit 251 and the fourth connector unit 252 may include a USB port. The third connector unit 251 may be connected to the first connector unit 340*a* of the interface device 300, and the fourth connector unit 252 may be connected to the second connector unit 340*b* of the interface device 300. Accordingly, the third connector unit 251 may be configured to receive the data of the SD card, transmit the received data to the microcomputer 254, and transmit a mode selection signal transmitted from the microcomputer 254 to the first connector unit 340*a*, and the fourth connector unit 252 may be configured to receive the data of the external device, transmit the received data to the microcomputer 254, and transmit the first current to the second connector unit 340*b* of the interface device 300. Accordingly, the third connector unit 251 and the fourth connector unit 252 may be configured to receive data from the interface device 300 and transmit the transmitted data to the microcomputer 254, by independently performing communication.

The slot unit 253 may include a slot to which the card-type memory 400*c* capable of performing communication such as third generation (3G) communication may be connected. The slot unit 253 may include a SD card slot. Accordingly, when the card-type memory is connected to the slot unit 253, communication with the external device may be possible. The microcomputer 254 may be configured to determine whether the external device is connected to the port unit 320 of the interface device 300, display a pop-up window for selecting the mode of the external device on the display unit in response to determining that the external device is connected, and output the mode selection signal of the second mode that corresponds to the mode selection signal selected when the mode of the external device is selected by a user.

In other words, the microcomputer 254 may be configured to output the voltage signal via the power supply terminal of the third connector unit 251 when the second mode is selected by the user. The microcomputer 254 may further be configured to block communication with the external device connected to the port unit 320 of the interface device 300 when the second mode is selected. The microcomputer 254 may be configured to request a path retrieval to the server (not shown) when a destination is input in the navigation function, and guide the path toward the destination based on the retrieved path when the retrieved path is transmitted from the server (not shown). The microcomputer 254 may be configured to use the map data of the SD card 400*a* transmitted from the interface device 300 via the third connector unit 251.

The microcomputer 254 may further be configured to perform a portion of functions performed in the external device when the data of the external device is received via the fourth connector unit 252 when the external device is the first mode. The microcomputer 254 may be configured to perform the navigation function using the data of the SD card received via a different USB communication line, operate the display unit to output operation information based on the navigation function on the display unit, perform a CarPlay function using the data of the external device, and operate the display unit to output operation information of the CarPlay function on the display unit. The multimedia player 200 may further include a communication unit. The communication unit of the multimedia player 200 may be configured to perform communication with the GPS (not shown), and transmit a received current position to the controller 250.

In particular, the GPS may be configured to calculate a position of the subject or traveling vehicle in which it is installed by receiving an input of a position signal from each of the plurality of GPS satellites, and transmit the calculated position to the communication unit. Further, the GPS may include a GPS antenna configured to receive a satellite signal from the plurality of GPS satellites, an acceleration sensor (not shown) configured to measure acceleration of the vehicle, and a direction sensor (not shown) configured to sense a direction of the vehicle, and transmit a current position of the vehicle, acceleration data, and direction data to the communication unit.

The communication unit of the multimedia player 200 may be configured to perform communication with the external device and the server (not shown) via a wired or wireless communication network. In particular, the wired or wireless communication network may include a broadcasting network such as a transport protocol expert group (TPEG), a Stream X-Machine (SXM), a relational database service (RDS) for a Digital Multimedia Broadcasting (DMB), etc.

Further, the server (not shown) may be configured to perform communication with the multimedia player 200, retrieve a path based on the current position of the vehicle and the destination when the path retrieval request signal is transmitted from the multimedia player 200, and transmit the retrieved path to the multimedia player 200. The multimedia player 200 may further include a sound unit (not shown). The sound unit of the multimedia player 200 may be configured to output a path and driving information as a sound when guiding toward the destination, and also output music or a sound of an image, etc. selected by the user.

Figure 7:
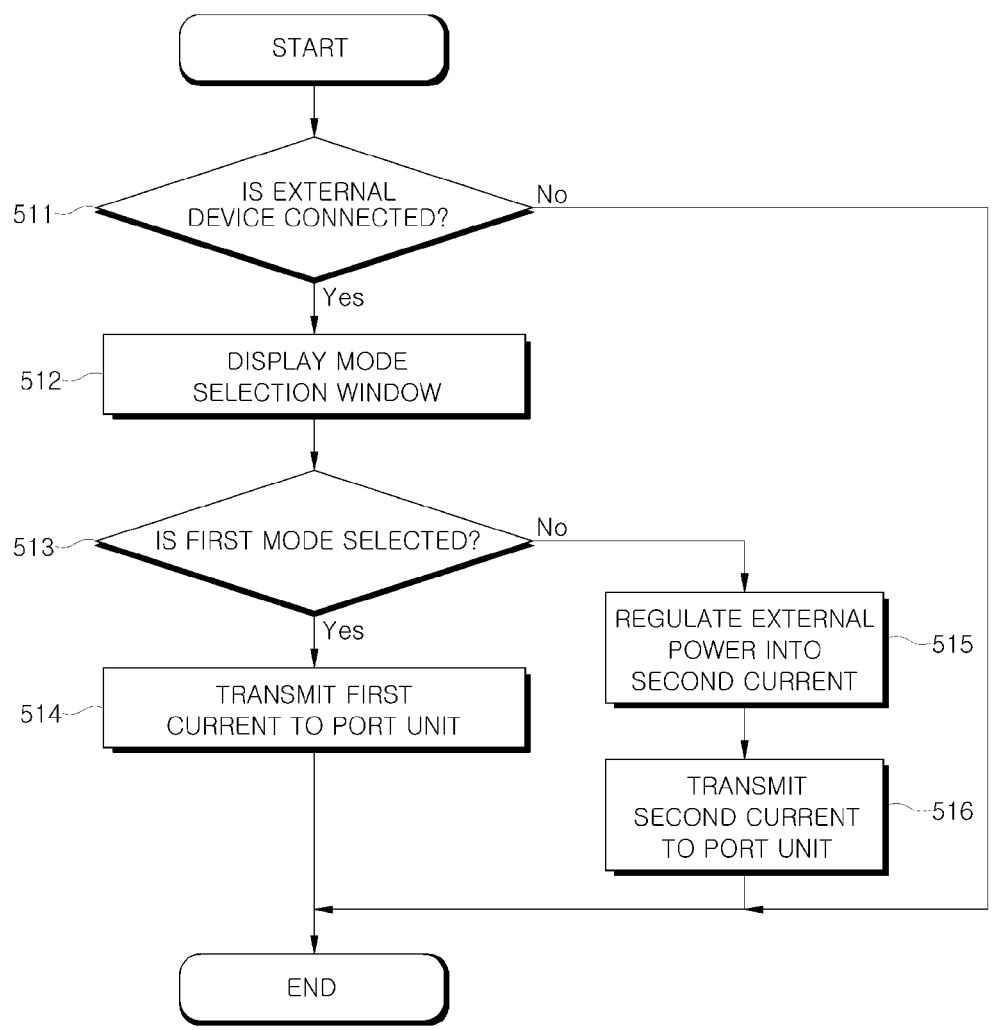
FIG. 7 is an exemplary flowchart for describing control of a vehicle in which an interface device and a multimedia player are provided according to an exemplary embodiment of the present invention.

FIG. 7 is an exemplary flowchart for describing control of a vehicle in which an interface device and a multimedia player are installed according to an exemplary embodiment of the present invention, and this will be described with reference to FIGS. 8 to 11. When the vehicle 1 is started, the battery within the vehicle 1 may be configured to provide power to various electronic devices.

Furthermore, the driving power may also be provided to the multimedia player 200 disposed within the vehicle 1, and a standby screen may be displayed on the display unit of the multimedia player 200. The multimedia player 200 may be configured to transmit the reference current for performing the USB communication to the interface device 300. Further, the electronic device disposed within the vehicle 1 may be configured to transmit the reference current for performing the USB communication to the interface device 300. The multimedia player 200 may be configured to confirm a function selected by the user, and perform the confirmed function. For example, the multimedia player 200 may be configured to receive a broadcasting signal and output a broadcasting image and an audio signal as an image and a sound when the DMB function is selected by the user, and output an audio signal as the sound when the audio play function is selected by the user.

The multimedia player 200 may further be configured to perform the navigation function when the navigation function is selected. In other words, the multimedia player 200 may be configured to perform communication with the GPS when a selection signal for the navigation function is selected, and receive the map data from the SD card 400a which is the card-type memory inserted into the interface device 300 by performing communication with the interface device 300. The interface device 300 may be configured to read the map data of the card-type memory via the SD communication line in response to the selection signal for the navigation function, and transmit the read map data to the multimedia player 200 by switching to the USB communication line.

In particular, the transmitting of the map data of the card-type memory (the SD card) to the multimedia player 200 may include transmitting the map data of the SD card connected to the slot unit 310 of the interface device 300 to the first hub terminal 315a of the hub unit 315 via the SD communication line, and transmitting the map data transmitted to the first hub terminal 315a to the third hub terminal 315c by switching the SD communication line to the USB communication line. After this, the first connector unit 340a connected to the third hub terminal 315c of the hub unit 315 may be configured to transmit the map data to the third connector unit 251 electrically connected via the USB communication line. The third connector unit 251 disposed within the controller 250 of the multimedia player 200 may be configured to transmit the map data transmitted from the interface device 300 to the microcomputer 254 of the multimedia player 200.

Figure 8:
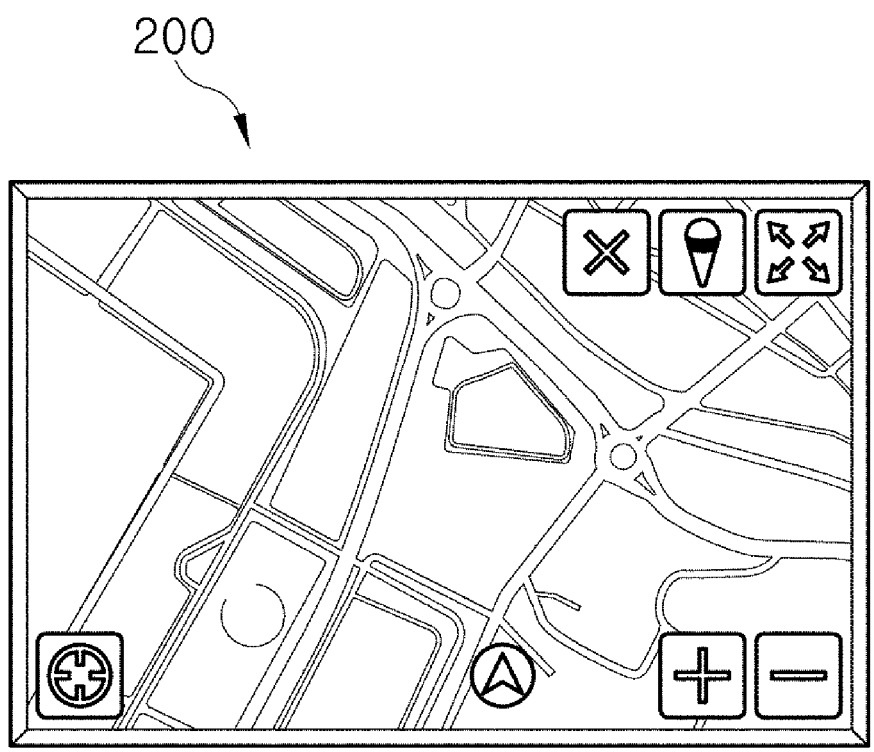
FIGS. 8 to 11 are exemplary diagrams illustrating a multimedia player and an external device which communicate using an interface device according to an exemplary embodiment of the present invention.

As shown in FIG. 8, the multimedia player 200 may be configured to perform the navigation function based on the GPS information and the map data, and guide toward the destination by displaying operation information generated by performing the navigation function on the display unit. Further, the multimedia player 200 may be configured to determine whether the external device is connected to the port unit 320 while performing the navigation function (511). In other words, the multimedia player 200 may be configured to determine whether the smart phone 400b which is the external device is connected to the port unit 320 of the interface device 300 while the map data of the SD card 400a connected to the interface device 300 is provided, and when in response to determining that the smart phone 400b which is the external device is connected to the port unit 320 of the interface device 300, may be configured to display a mode selection window for selecting a mode of the smart phone 400b (512).

Figure 9:
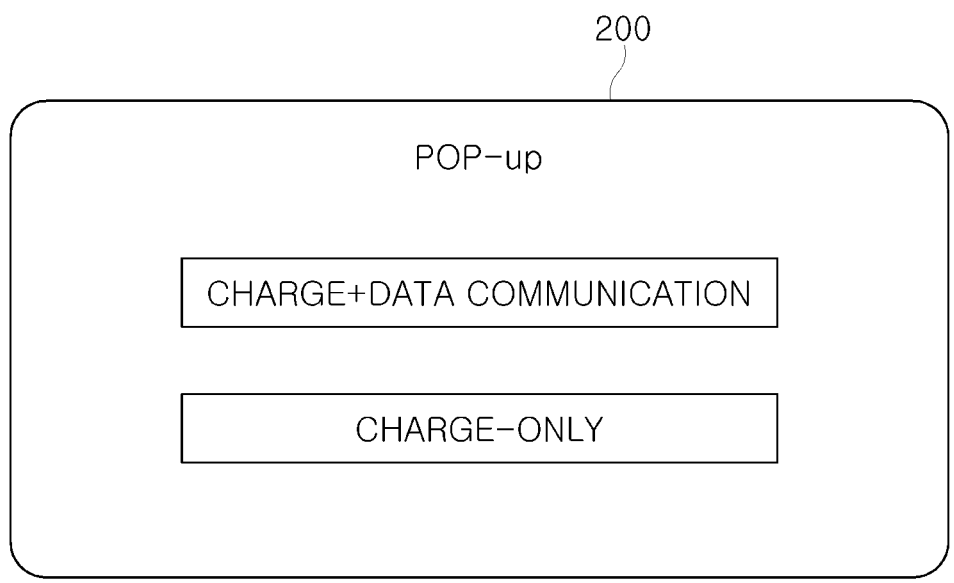

As shown in FIG. 9, the multimedia player 200 may be configured to display a mode selection button on the display unit to select the first mode of performing both of a charge of the smart phone 400b and data communication with the smart phone 400b, and the second mode of performing the charge of the smart phone 400b. The display unit and the input unit of the multimedia player 200 may be implemented as a touch screen, and thus the mode of the external device may be selected by touching the selection button displayed on the display unit.

The multimedia player 200 may be configured to prevent output of a voltage signal via the power supply terminal Vcc of the third connector unit 251 when the first mode is selected by the user, and output the voltage signal via the power supply terminal Vcc of the third connector unit 251 when the second mode is selected by the user. In particular, the voltage signal may be a signal that corresponds to the mode selection. The interface device 300 may be configured to determine a mode of the smart phone 400b which is the external device based on whether the voltage signal is received. In other words, the interface device 300 may be configured to transmit the first current transmitted from the fourth connector unit 252 of the multimedia player 200 to the port unit 320 via the second connector unit 340b and the selection unit 370 (513) when the first mode is selected in the multimedia player 200 (513), and also perform data communication with the multimedia player 200 via the second connector unit 340b, the selection unit 370, and the port unit 320.

In particular, the performing of the data communication may include transmitting data to perform at least one of a plurality of functions performed in the smart phone 400b in the multimedia player 200, and transmitting and receiving data corresponding to a CarPlay function before the smart phone 400b is separated. Further, the interface device 300 may be configured to transmit data of the smart phone 400b to the multimedia player 200 using the USB communication line of the second connector unit which is another USB communication line (e.g., a second USB communication line) different from the USB communication line (e.g., a first USB communication line) of the first hub terminal 315a transmitting the map data when the smart phone 400b is the port unit 320.

Figure 10:
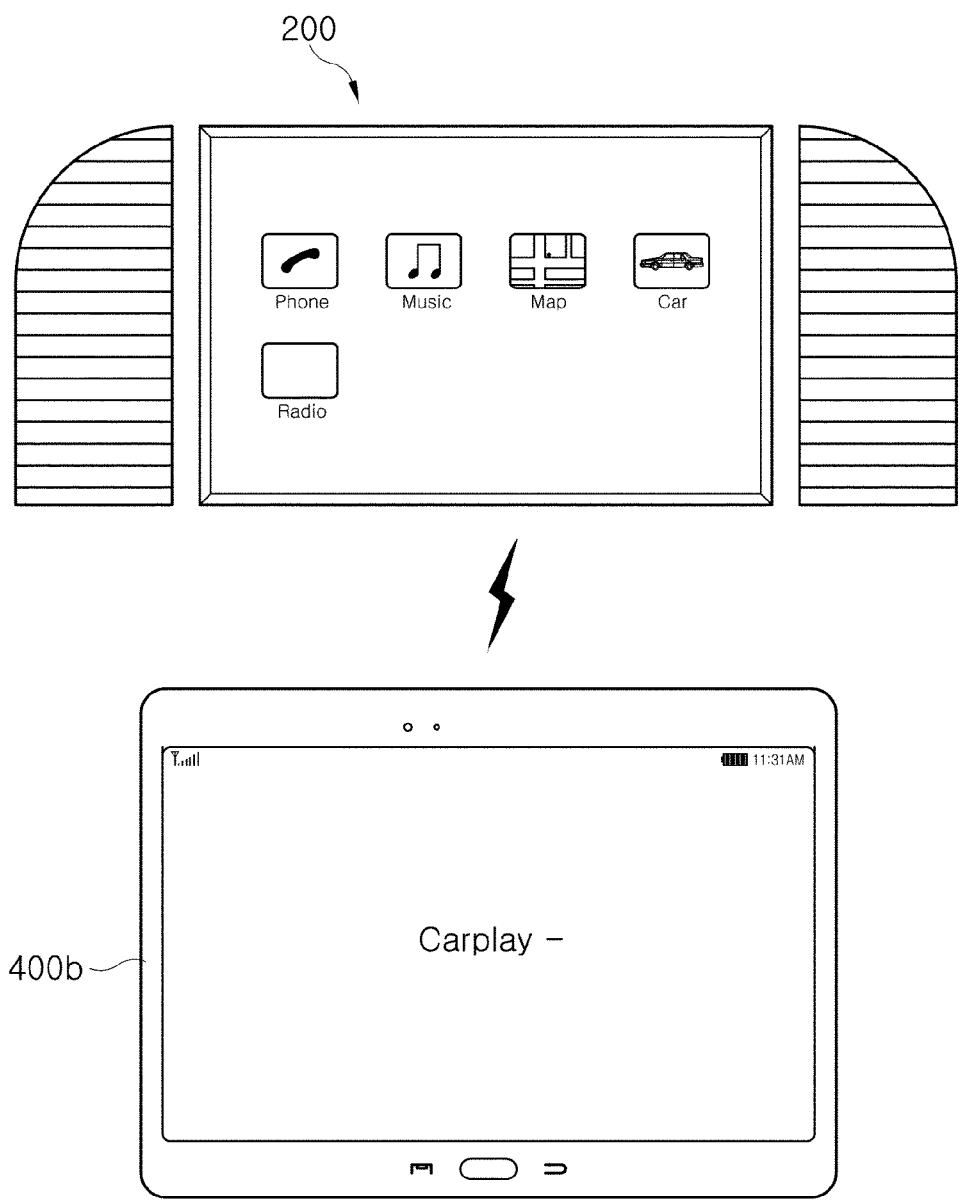

As shown in FIG. 10, the multimedia player 200 may be configured to perform communication with the smart phone 400b via the interface device 300 when the smart phone 400b is connected to the port unit 320 of the interface device 300, and display information displayed on the screen of the smart phone 400b. However, the multimedia player 200 may be able to output information on display by receiving the screen of the smart phone 400b as it is, and may be configured to output information on the display an available function in vehicle 1. In other words, the multimedia player 200 may be configured to display the available function. Additionally, the multimedia player 200 may be configured to perform the display function, and an actual execution of the application, a data processing, and communication may be performed in the smart phone 400b. In other words, the smart phone 400b may be configured to block reception of data with respect to a game application by considering safety of a driver in the CarPlay function, and transmit music and video playback, and a messenger application, etc. to the multimedia player 200. Further, the multimedia player 200 may be configured to output content as a sound when the messenger application is executed.

Figure 11:
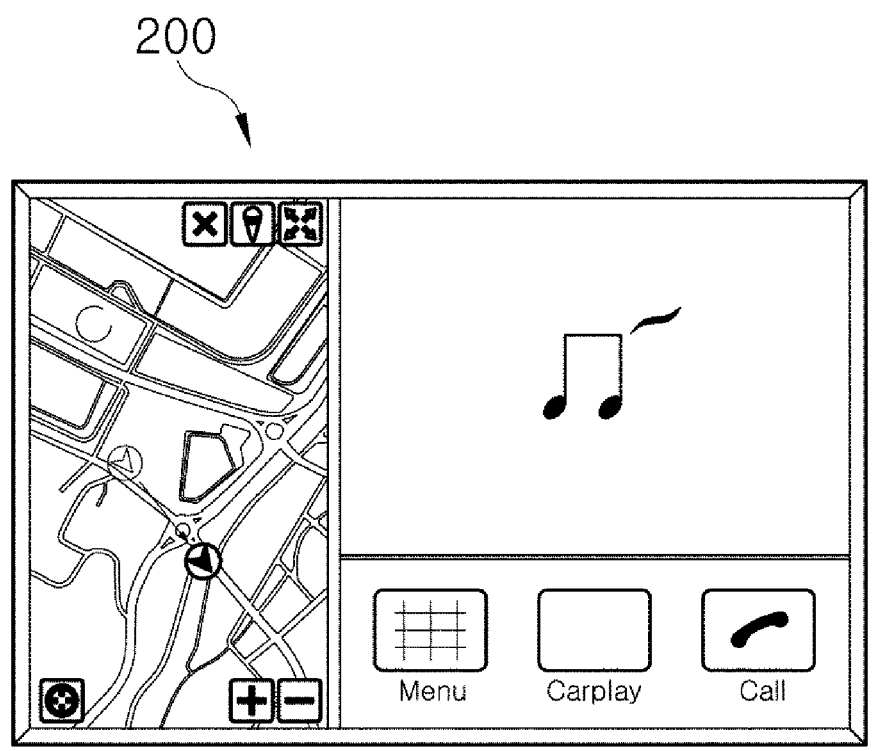

As shown in FIG. 11, the multimedia player 200 may be configured to display both of operation information with respect to the navigation function and operation information with respect to the CarPlay function on one display unit, and may be configured to separately display the operation information with respect to the navigation function and the operation information with respect to the CarPlay function on different areas. In response to determining that the second mode is selected, the interface device 300 may be configured to regulate a current of the external power transmitted from the external power supply unit into the second current (515), and transmit the regulated second current to the port unit 320 after switching the switch of the selection unit 370 (516). More specifically, in response to determining that the first mode is selected, a voltage signal may not be received to the first connector unit 340a and the third hub terminal 315c of the hub unit 315, and thus the voltage signal may not be received to the second hub terminal 315b and the selection unit 370.

Furthermore, a switching position of the switch disposed in the selection unit 370 of the interface device 300 may be maintained, and thus the first current transmitted from the fourth connector unit 252 may be transmitted to the port unit 320. In other words, the smart phone 400b may be configured to receive the first current for a general charge via the port unit 320 of the interface device 300. When the second mode is selected and the voltage signal is received to the first connector unit 340a and the third hub terminal 315c of the hub unit 315, the interface device 300 may be configured to transmit the received voltage signal to the selection unit 370 via the second hub terminal 315b.

The selection unit 370 of the interface device 300 may be configured to switch the internal switch by the voltage signal when the voltage signal is received, and transmit the second current of the regulation unit 360 to the port unit 320 by the switching operation of the switch. The multimedia player 200 and the smart phone 400b may not perform data communication. Therefore, the smart phone may be configured to receive the second current for the rapid charge via the port unit 320 of the interface device 300. Accordingly, the vehicle 1 may be configured to rapidly charge the external electronic device connected to the interface device 300 using the USB port. Moreover, the CarPlay function and an Android auto function may be applied to the AVN device which is the multimedia player 200 within the vehicle 1, and also the navigation function may be performed using the map data of the card-type memory (the SD card).

The present invention may improve merchantability since the electronic device may be rapidly charged using the USB port within the vehicle. The present invention may apply the CarPlay function and the Android auto function to the AVN device which is the multimedia player within the vehicle, and also perform the navigation function using the map data of the card-type memory (the SD card). Further, the present invention may improve merchantability and design of the interface device since the memory card (SD card) slot, the USB port, and the AUX terminal may be integrally arranged.

Moreover, the present invention may reduce a length of the cable connected to the card-type memory within 200 mm by arranging the slot unit to which the card-type memory in which the map data is stored is connected on the interface device and switching to the USB communication line, and may reduce a manufacturing cost since the SD cable for connecting the navigation (AVN) device and the SD card is more expensive than the hub IC added to the card-type memory (the SD card). In addition, the present invention may prevent loss of the SD memory in which the map data is stored, improve design of the interface device, and secure space for the center fascia, etc. within the vehicle, by moving the SD slot to the bottom of the center fascia having a minimal exposure. Further, the present invention may reduce an update time of the AVN device, and improve convenience by storing the map data to the memory card. Accordingly, the present invention may improve quality and merchantability of the interface device and the vehicle.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. An interface device connecting a multimedia player and an external device, comprising:
   a port unit in which the external device is connected, and configured to transmit a first current transmitted from the multimedia player to the external device;
   a regulation unit configured to regulate a current of external power into a second current;
   a hub unit configured to receive a mode selection signal of the external device from the multimedia player, and select a first mode of simultaneously performing data communication and a charge or a second mode of performing only the charge, according to the received mode selection signal; and a selection unit configured to receive the mode selection signal, and switch the first current transmitted to the port unit to the second current based on the received mode selection signal, wherein the hub unit is further configured to perform universal serial bus (USB) communication with the multimedia player and the selection unit, and transmit a voltage signal transmitted via a VBUS of a USB connector unit of the multimedia player to the selection unit, and the voltage signal transmitted through the VBUS is the mode selection signal of the second mode.

2. The interface device according to claim 1, wherein the selection unit is configured to transmit the first current to the port unit when the mode selection signal of the first mode is received, and transmit the second current to the port unit when the mode selection signal of the second mode is received.

3. The interface device according to claim 1, further comprising:
a slot unit in which a card-type memory is connected,
wherein the hub unit is connected to the slot unit, and is configured to switch a communication line of the card-type memory to a universal serial bus (USB) communication line.

4. The interface device according to claim 3, further comprising:
a first connector unit connected to the hub unit, and configured to transmit data of the card-type memory to the multimedia player; and
a second connector unit connected to the selection unit, and configured to transmit data of the external device to the multimedia player and transmit the first current transmitted from the multimedia device to the selection unit.

5. The interface device according to claim 4, wherein each of the first connector unit and the second connector unit includes a USB port having an independent USB communication line.

6. The interface device according to claim 4, wherein the first connector unit and the second connector unit are connected to the multimedia player by a cable or a connector.

7. The interface device according to claim 3, further comprising:
a terminal unit configured to input and output an audio signal.

8. A vehicle, comprising:
a multimedia player; and
an interface device configured to transmit data to the multimedia player,
wherein the interface device comprises:
a port unit to which an external device is connected, and configured to perform universal serial bus (USB) communication with the external device, receive a reference current from the multimedia player, and transmit the reference current to the external device;
a regulation unit configured to regulate external power into a predetermined constant current;
a selection unit configured to transmit the predetermined constant current or the reference current to the port unit based on a mode selection signal; and
a hub unit configured to receive the mode selection signal of the external device from the multimedia player, select a first mode of simultaneously performing data communication and a charge or a second mode of performing only the charge, according to the received mode selection signal, and transmit the mode selection signal to the selection unit, wherein the hub unit is further configured to perform USB communication with the multimedia player and the selection unit, and transmit a voltage signal transmitted via a VBUS of a USB connector unit of the multimedia player to the selection unit, and the voltage signal transmitted through the VBUS is the mode selection signal of the second mode.

9. The vehicle according to claim 8, wherein the selection unit is configured to transmit the reference current to the port unit when the mode selection signal of the first mode is received, and transmit the constant current to the port unit when the mode selection signal of the second mode is received.

10. The vehicle according to claim 8, further comprising:
a slot unit in which a card-type memory in which map data is stored is connected,
wherein the hub unit is connected to the slot unit, and is configured to switch a communication line of the card-type memory to a USB communication line.

11. The vehicle according to claim 10, further comprising:
a first connector unit connected to the hub unit, and configured to transmit data of the card-type memory to the multimedia player; and
a second connector unit connected to the selection unit, and configured to transmit data of the external device to the multimedia player and transmit the reference current transmitted from the multimedia device to the selection unit.

12. The vehicle according to claim 11, wherein each of the first connector unit and the second connector unit includes a USB port having an independent USB communication line.

13. The vehicle according to claim 11, wherein the multimedia player includes:
a third connector unit connected to the first connector unit, and configured to receive the data of the card-type memory;
a fourth connector unit connected to the second connector unit, and configured to receive the data of the external device and transmit the reference current; and
a controller configured to receive at least one of the data of the card-type memory or the data of the external device.

14. The vehicle according to claim 13, wherein the controller is configured to independently execute communications of the third connector unit and the fourth connector unit.

15. The vehicle according to claim 13, wherein the multimedia player is configured to perform a portion of functions of the external device connected to the third connector unit.

16. A method of controlling an interface device for transmitting data to a multimedia player arranged in the vehicle, comprising:
determining, by a controller, whether an external device performing universal serial bus (USB) communication is connected;
determining, by the controller, a mode of the external device in response to determining that the external device is connected;
transmitting, by the controller, a first current transmitted from the multimedia player to the external device when the mode of the external device is a first mode of simultaneously performing data communication and charge; and transmitting, by the controller, a second current to the external device by regulating external power into the second current when the mode of the external device is a second mode of performing only the charge, wherein the determining of the mode of the external device includes:

determining, by the controller, whether a voltage signal is transmitted via a VBUS of a USB connector unit of the multimedia player, and determining, by the controller, a mode selection signal for the second mode when it is determined that the voltage signal is transmitted to a hub unit.

17. The method of controlling the interface device according to claim 16, wherein the first mode is a mode of charging the external device and performing data communication between the external device and the multimedia player, and the second mode is a charge-only mode of charging the external device.

18. The method of controlling the interface device according to claim 16, further comprising:

determining, by the controller, whether a navigation function is performed in the multimedia player; and transmitting, by the controller, map data stored in a card-type memory to the multimedia player via a USB communication line by switching a SD communication line to the USB communication line when the navigation function is performed.

19. The method of controlling the interface device according to claim 18, further comprising:

determining, by the controller, whether the external device is connected to a port unit of the interface device while performing the navigation function; and transmitting, by the controller, the data of the external device to the multimedia player via another USB communication line which is different from the USB communication line when it is determined that the external device is connected to the port unit.

* * * * *